(12) United States Patent
Bang

(10) Patent No.: US 7,311,348 B1
(45) Date of Patent: Dec. 25, 2007

(54) HOUSING APPARATUS OF FUEL DOOR

(75) Inventor: Jae Chul Bang, Seoul (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 11/646,074

(22) Filed: Dec. 26, 2006

(30) Foreign Application Priority Data

Nov. 28, 2006 (KR) ...................... 10-2006-0118461

(51) Int. Cl.
*B62D 25/00* (2006.01)

(52) U.S. Cl. ..................... 296/97.22; 220/86.2; 220/95

(58) Field of Classification Search ............ 296/97.22; 220/86.2, 905
See application file for complete search history.

(56) References Cited

U.S. PATENT DOCUMENTS

| | | | |
|---|---|---|---|
| 5,234,122 A * | 8/1993 | Cherng .................... 296/97.22 |
| 5,390,808 A * | 2/1995 | Choma et al. ............. 220/86.2 |
| 5,906,406 A * | 5/1999 | Pajakowski ............... 296/97.22 |
| 6,033,006 A * | 3/2000 | Bovellan et al. ......... 296/97.22 |
| 6,431,228 B2 * | 8/2002 | Foltz et al. ................ 220/86.2 |

* cited by examiner

*Primary Examiner*—Lori L. Lyjak
(74) *Attorney, Agent, or Firm*—Morgan Lewis & Bockius LLP

(57) ABSTRACT

A housing apparatus of a fuel neck includes a main housing with a first connecting portion connected to a vehicle body, and a hole with a door connected thereto; and a sub housing with a second connecting portion connected to the main housing by an elastic force. The sub housing is elastically connected to the fuel neck. The first connecting portion is elastically connected to the vehicle body, and includes a first protruding portion secured to the vehicle body; and a second protruding portion at a lower portion of the first protruding portion. The second connecting portion includes a connecting hole to which the main housing is inserted; and at least one protrusion securing the main housing to the sub housing. The main housing further includes a third protruding portion inserted to the connecting hole.

7 Claims, 5 Drawing Sheets

HOUSING APPARATUS OF FUEL DOOR

CROSS-REFERENCE TO RELATED APPLICATION

This application claims priority to and the benefit of Korean Patent Application No. 10-2006-0118461 filed in the Korean Intellectual Property Office on Nov. 28, 2006, the entire contents of which are incorporated herein by reference.

BACKGROUND OF THE INVENTION (a) Field of the Invention

The present invention relates to a housing apparatus of a fuel door.

(b) Description of the Related Art

Typically, a fuel injecting hole (fuel neck) is located in a fuel door. The fuel neck is disposed in a housing apparatus mounted in a vehicle body. The housing apparatus is typically made of steel and welded to the vehicle body. In addition, a hole to which the fuel door is connected is provided on the housing apparatus, a nut is welded to the hole, and the fuel door is connected by a bolt connected to the nut.

The housing apparatus may deform during welding. Therefore, because the hole to which the fuel door is connected is deformed, the fuel door is not connected to its desired position.

In addition, because the fuel neck is connected only in a horizontal direction, the assembling process is uncomfortable. Further, because the housing apparatus is made of steel, manufacturing cost and weight are high.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides a housing apparatus in which a fuel neck is located. The housing apparatus includes a main housing including a first connecting portion configured to be connected to a vehicle body, and a hole configured for a door to be connected thereto; and a sub housing including a second connecting portion connected to the main housing by an elastic force thereof.

The sub housing may be elastically connected to an exterior circumference of the fuel neck such that the fuel neck is connected to the main housing in a vertical direction.

The first connecting portion is connected to the vehicle body by an elastic force thereof and includes a first protruding portion secured to the vehicle body; and a second protruding portion formed to a lower portion of the first protruding portion.

The second connecting portion includes a connecting hole to which the main housing is inserted, and at least one protrusion formed such that the main housing is secured to the sub housing.

The main housing further includes a third protruding portion inserted to the connecting hole.

The first connecting portion may be made of a rubber material and the remainder of the main housing may be made of a plastic material.

The sub housing may be made of a rubber material.

DETAILED DESCRIPTION OF THE PREFERRED EMBODIMENTS

An exemplary embodiment of the present invention will hereinafter be described in detail with reference to the accompanying drawings.

Figure 1:
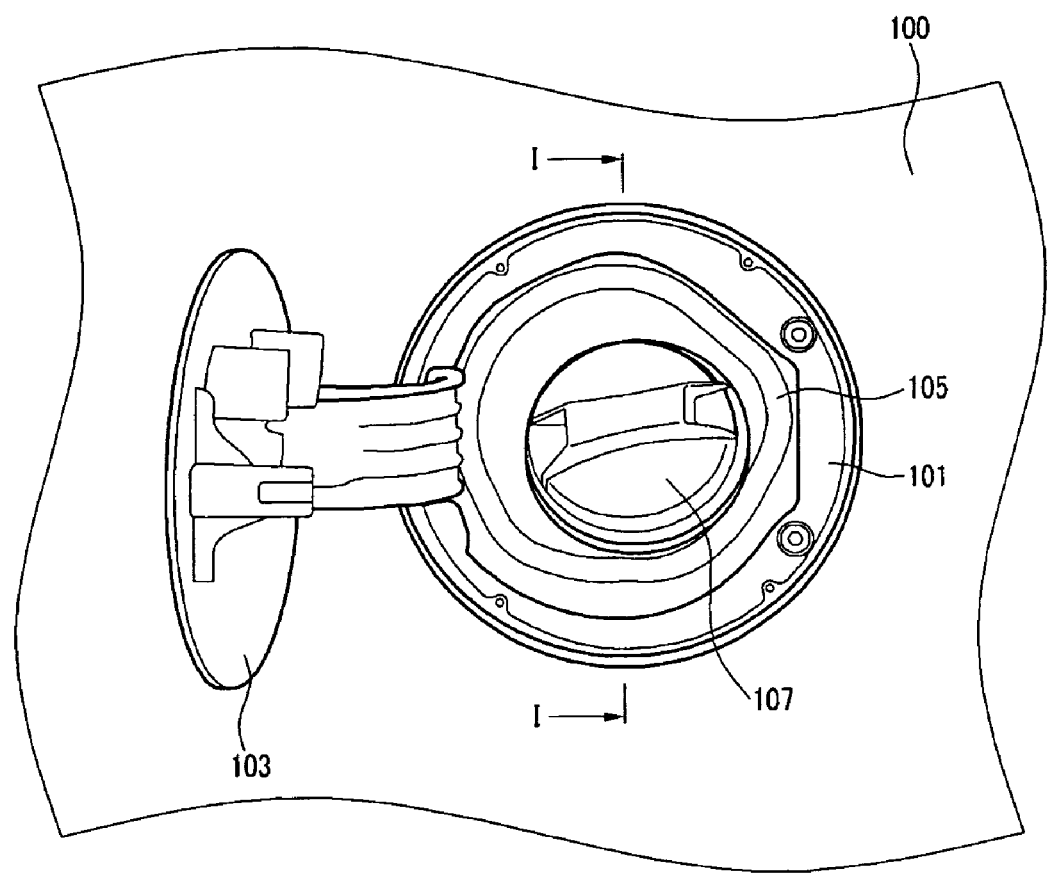
FIG. 1 is a front perspective view of a fuel door and a housing apparatus according to an exemplary embodiment of the present invention.
Figure 2:
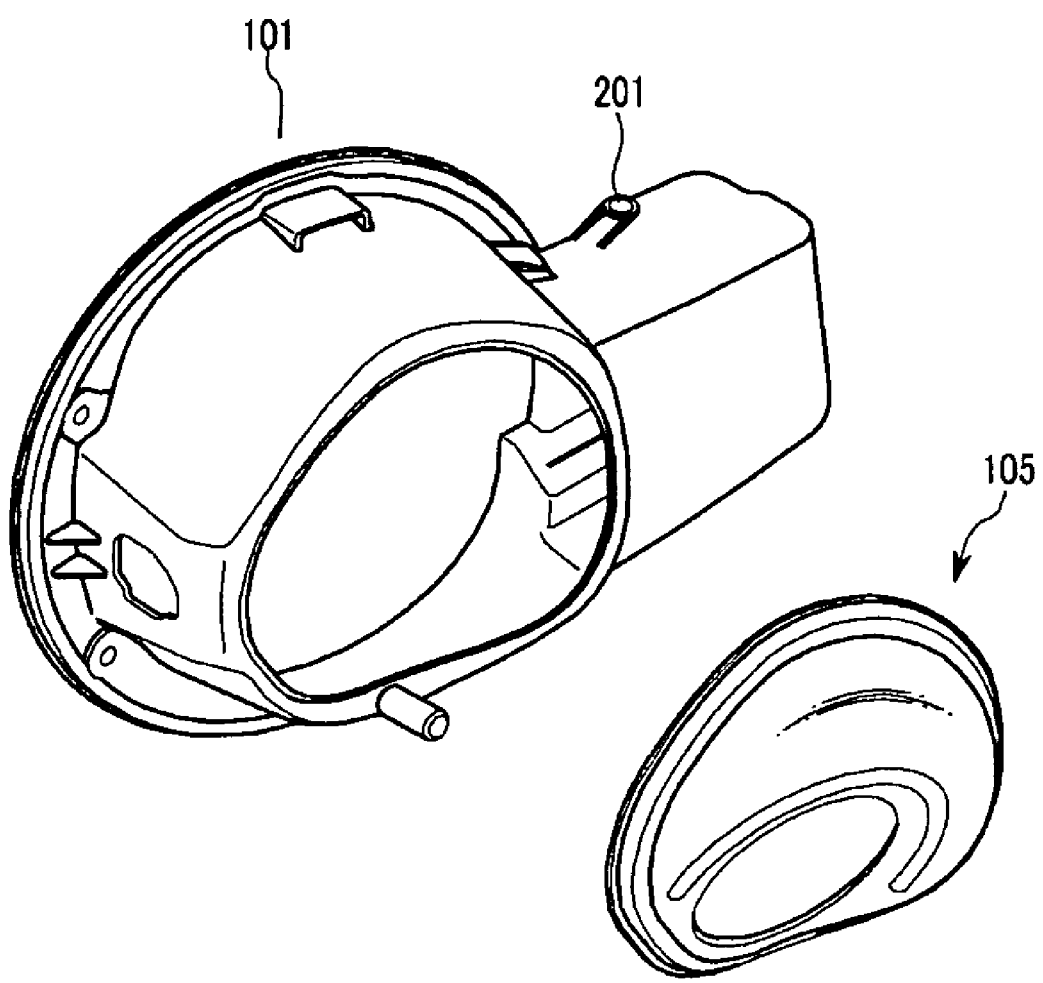
FIG. 2 is an exploded perspective view of a housing apparatus according to an exemplary embodiment of the present invention.
Figure 3:
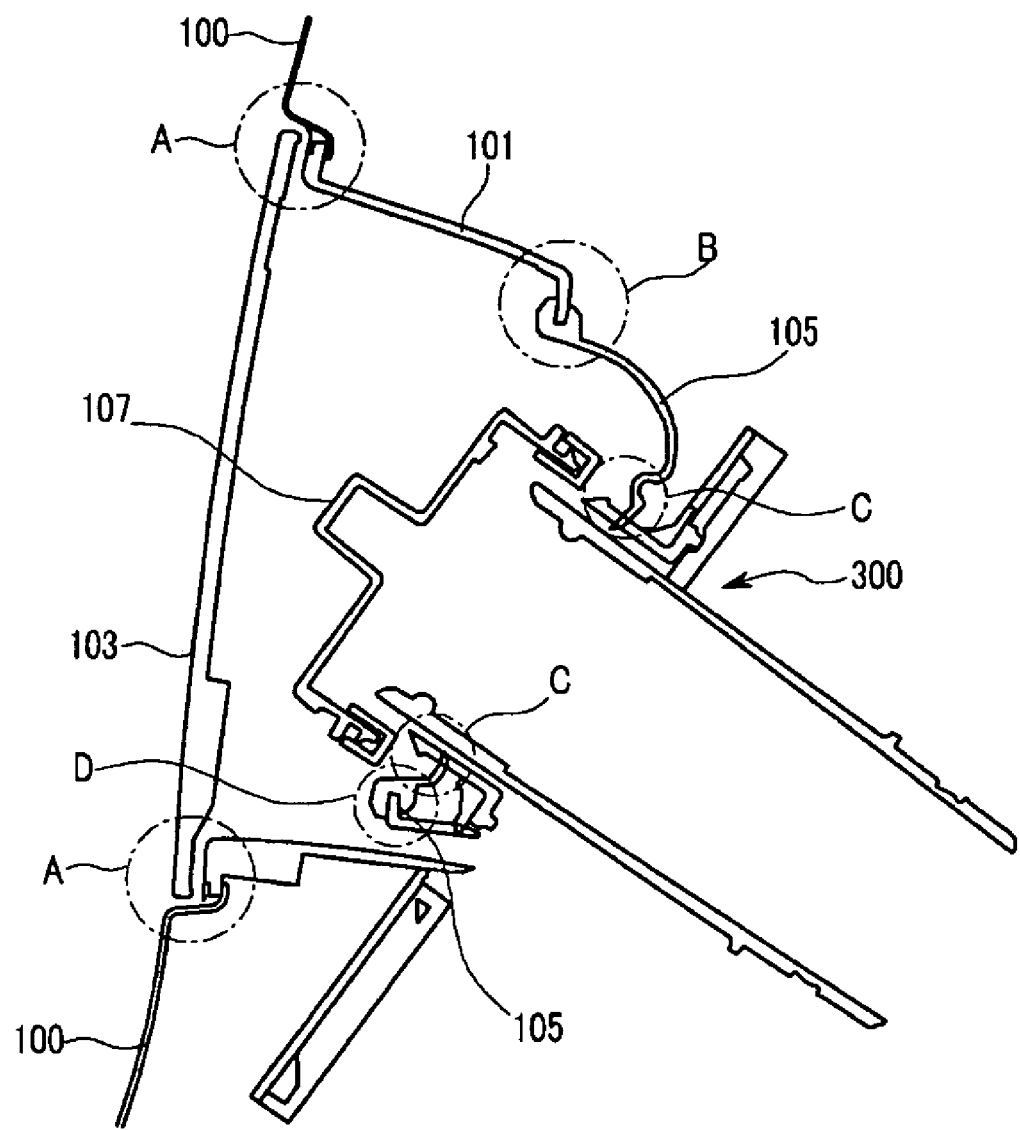
FIG. 3 is a cross-sectional view along line I-I of FIG. 1.

As shown in FIG. 1 to FIG. 3, according to an exemplary embodiment of the present invention, a housing apparatus in which a fuel neck is located includes a main housing 101 and a sub housing 105.

Figure 4:
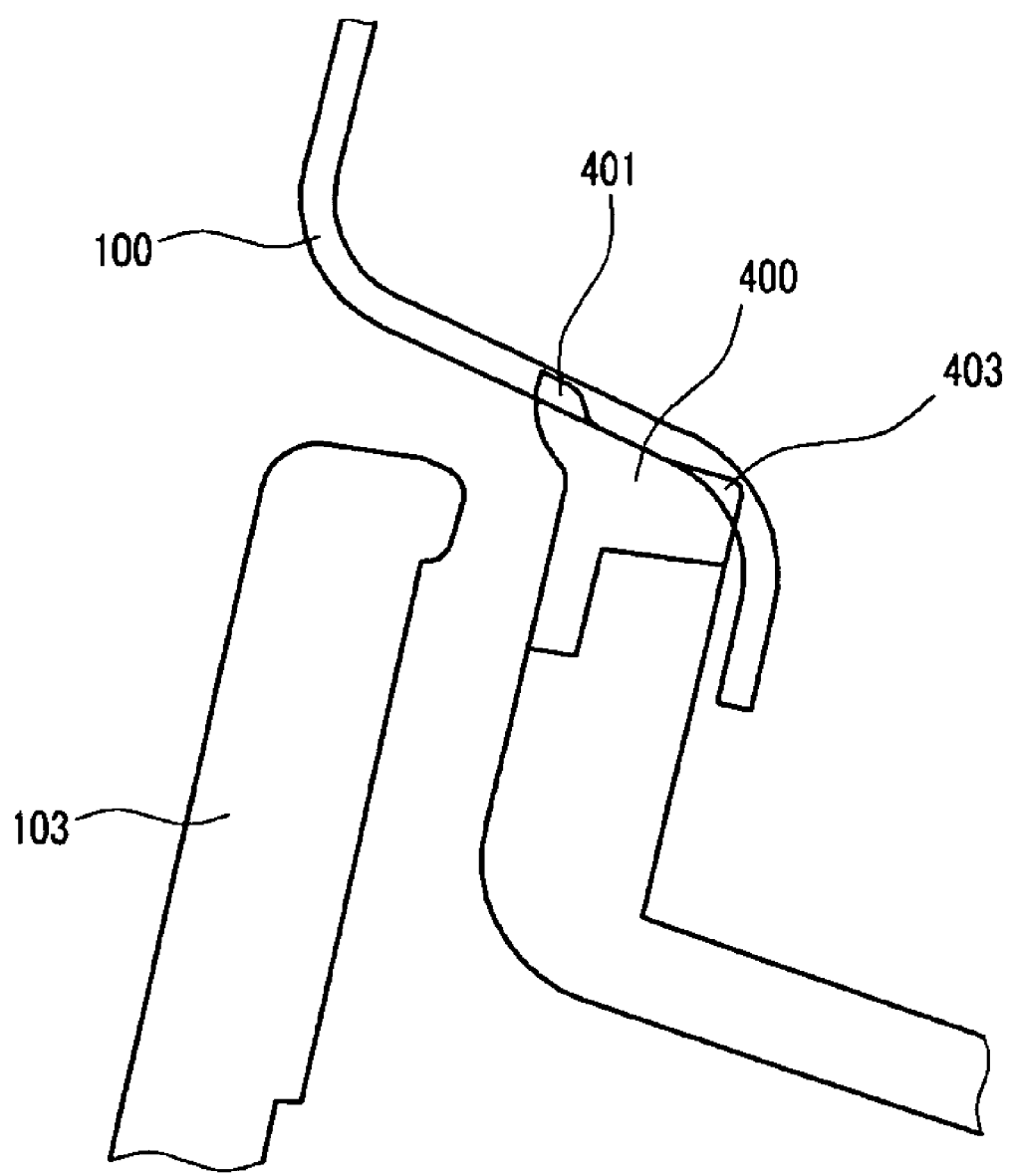
FIG. 4 shows portion A of FIG. 3.

The main housing 101 defines a first connecting portion 400 (FIG. 4) configured to be connected to a vehicle body 100, and a hole 201 (FIG. 2) configured for a door 103 to be connected thereto by a hinge (not shown).

The sub housing 105 is elastically connected to an exterior circumference of the fuel neck 300 such that the fuel neck 300 is connected to the main housing 101 in a vertical direction and includes a second connecting portion 500 connected to the main housing 101 by an elastic force thereof.

The first connecting portion 400 includes a first protruding portion 401 secured to the vehicle body 100 and a second protruding portion 403 formed to a lower portion of the first protruding portion 401.

As shown in FIG. 1 to FIG. 3, a cap 107 is provided on an upper portion of the fuel neck 300.

The main housing 101 is connected to the vehicle body 100 and the sub housing 105 is connected to the main housing 101. Referring to FIG. 2 and FIG. 3, an area of one side of the sub housing 105 is wide and an area of the other side thereof is narrow. Therefore, the fuel neck 300 can be connected vertically to the housing apparatus, simplifying the manufacturing process.

The first connecting portion 400 may be made of a rubber material and the main housing 101 is connected to the vehicle body 100 by an elastic force of first the connecting portion 400. The remaining portion of the main housing 101, excluding the first connecting portion 400, may be made of a plastic material.

Therefore, because the first connecting portion 400 is made of the rubber material and connected to the vehicle body 100 but by an elastic force, manufacturing process is simplified.

Figure 5:
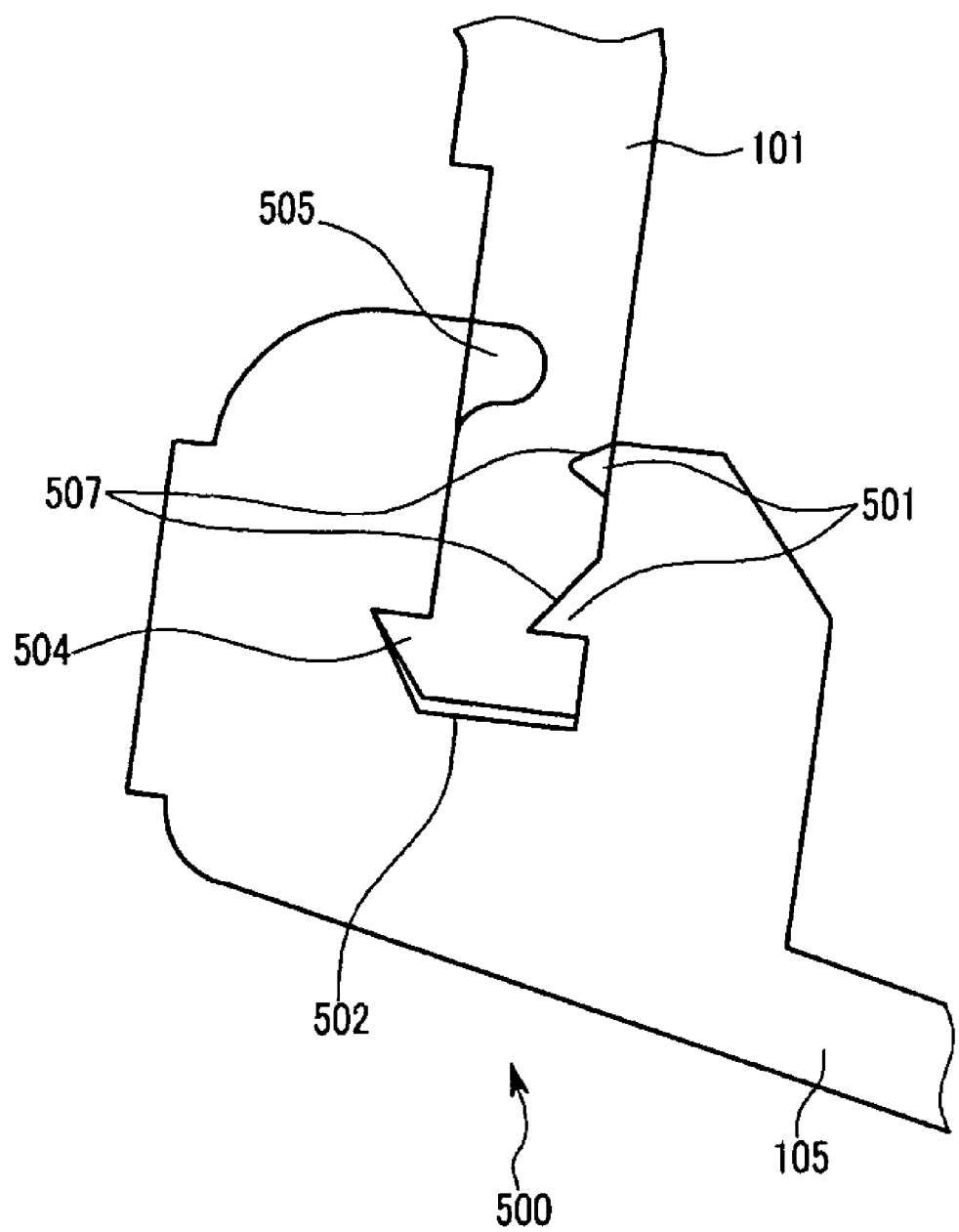
FIG. 5 shows portion B of FIG. 3.

Referring to FIG. 5, the second connecting portion 500 includes a connecting hole 502 and at least one protrusion 501 inserted in at least one groove 507 in the main housing 101. The main housing 101 is inserted to the connecting hole 502 and the at least one a protrusion 501 is configured such that the main housing 101 is secured in the sub housing 105.

The main housing 101 further includes a third protruding portion 504 inserted in the connecting hole 502.

A protruding portion 505 on the second connecting portion 500 is connected to the main housing 101 by being compressed.

The sub housing 105 may be made of the rubber material. Therefore, the sub housing 105 can be connected to the main housing 101 and the fuel neck 300 by an elastic force.

In portion C of FIG. 3, the sub housing 105 is elastically connected to the fuel neck 300.

According to an exemplary embodiment of the present invention, because the housing apparatus is not connected by welding, deformation does not occur to the housing apparatus and the fuel door can be connected to a precise position. In addition, the housing apparatus can be connected in a vertical direction and because it is connected by a simple force, manufacturing process can be simplified. Furthermore, because the housing apparatus is made of a rubber or a plastic material, manufacturing cost can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A housing apparatus of a fuel neck, comprising:
   a main housing comprising a first connecting portion configured to be connected to a vehicle body, and a hole configured for a door to be connected thereto; and
   a sub housing comprising a second connecting portion connected to the main housing by an elastic force thereof.

2. The apparatus of claim 1, wherein the sub housing is elastically connected to an exterior surface of the fuel neck.

3. The apparatus of claim 1, wherein the first connecting portion is connected to the vehicle body by an elastic force thereof and comprises:
   a first protruding portion secured to the vehicle body; and
   a second protruding portion disposed at a lower portion of the first protruding portion.

4. The apparatus of claim 1, wherein the second connecting portion comprises:
   a connecting hole to which the main housing is inserted; and
   at least one protrusion configured such that the main housing is secured to the sub housing.

5. The apparatus of claim 4, wherein the main housing further comprises a third protruding portion inserted to the connecting hole.

6. The apparatus of claim 1, wherein the main housing comprises a plastic material and the first connecting portion comprises a rubber material.

7. The apparatus of claim 1, wherein the sub housing comprises a rubber material.

* * * * *